United States Patent [19]

Harvey

[11] 4,363,572
[45] Dec. 14, 1982

[54] INJECTOR FOR A MATERIAL TRANSPORT SYSTEM

[75] Inventor: Andrew Harvey, Waltham, Mass.

[73] Assignee: Foster-Miller Associates, Inc., Waltham, Mass.

[21] Appl. No.: 292,808

[22] Filed: Aug. 14, 1981

Related U.S. Application Data

[63] Continuation of Ser. No. 46,258, Jun. 7, 1979, abandoned.

[51] Int. Cl.³ .................... B65G 53/30; B65G 53/48
[52] U.S. Cl. .................................. 406/58; 406/98; 406/99; 415/71; 417/68
[58] Field of Search ................... 406/56–58, 406/98–102; 415/71; 417/68

[56] References Cited

U.S. PATENT DOCUMENTS

| | | | |
|---|---|---|---|
| 772,606 | 10/1904 | Brossmann, Jr. | 406/58 |
| 2,324,042 | 7/1943 | Swenson | 406/58 |
| 2,544,813 | 3/1951 | Wall | 406/100 X |
| 3,291,535 | 12/1966 | Isbell et al. | 406/100 |

OTHER PUBLICATIONS

Hidrostral Solids Handling Pump.

*Primary Examiner*—Jeffrey V. Nase
*Attorney, Agent, or Firm*—Herbert L. Bello

[57] ABSTRACT

An injector for a material transport system includes a helical inducer having a housing with a fluid input port, a material input port and a discharge port, each port is open to an internal chamber of the housing. A rotor with a helical blade is mounted to the housing and constrained for rotation within the chamber. A fluid entering the fluid input port is formed into a fluid vortex having a ventilated core by the rotating rotor blade. A feeder assembly feeds the material to be transported into the material input port where it is carried by the fluid vortex to the discharge port for transmission to a hydraulic transport line.

10 Claims, 3 Drawing Figures

INJECTOR FOR A MATERIAL TRANSPORT SYSTEM

This application is a continuation, of application Ser. No. 46,258, filed June 7, 1979, now abandoned.

BACKGROUND OF THE INVENTION

1. Field of the Invention

The invention relates to material handling systems and, more particularly, is directed towards an injector for material transportation systems.

2. Description of the Prior Art

Mining of coal in modern underground mines involves a highly mechanized operation. Most coal is cut by large continuous mining machines which have large rotating cutting drums. In one haulage system, the cut coal is carried away from the mine face on a short conveyor and fed into a shuttle car. Due to space limitations in the mine, only one shuttle car can be accomodated in the loading area at one time. This batch nature of the shuttle car configuration limits the duty cycle of the continuous mining maching and reduces the productivity of the mining operation. In another haulage system, the cut coal is fed continuously rather than in batches. This system top sizes the coal, premixes it with water in a hopper and pumps the mixture with a centrifugal slurry pump to a preparation plant outside of the mine. Slurry pumps are too large to be used in low coal seams. In addition, slurry mixing prior to injection is impractical in low coal seams because of the level control problem associated with shallow hoppers. Centrifugal pumps for transporting particulate solids suffer from the disadvantage that increasing pressure within the pump results in a decreasing flow rate. A need exists for improvements in haulage systems for transportation of particulate solids.

SUMMARY OF THE INVENTION

It is an object of the present invention to provide an injector for a continuous transport system.

Another object of the present invention is to provide aninjector for a particulate solids transport system.

Yet another object of the invention is to provide an inducer for injection of particulate solids into a transport line.

A further object of the invention is to provide an injector for a material transport system having a helical inducer for injecting particulate solids into a hydraulic transport line. The helical inducer includes a housing with an internal chamber and having a fluid input port, a material input port and a discharge port, each port is open to the internal chamber. A rotor with one or more helical blades is mounted to the housing and constrained for rotation within the chamber. The blade is configured to create a fluid vortex having a ventilated core from a fluid entering the chamber through the fluid inport port. A feeder assembly feeds the particulate solids through the material input port which is adjacent the blade end and the mouth of the fluid vortex. The particulate solids are fed into the fluid vortex and carried by the vortex to the discharge port for injection into a hydraulic transport line.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
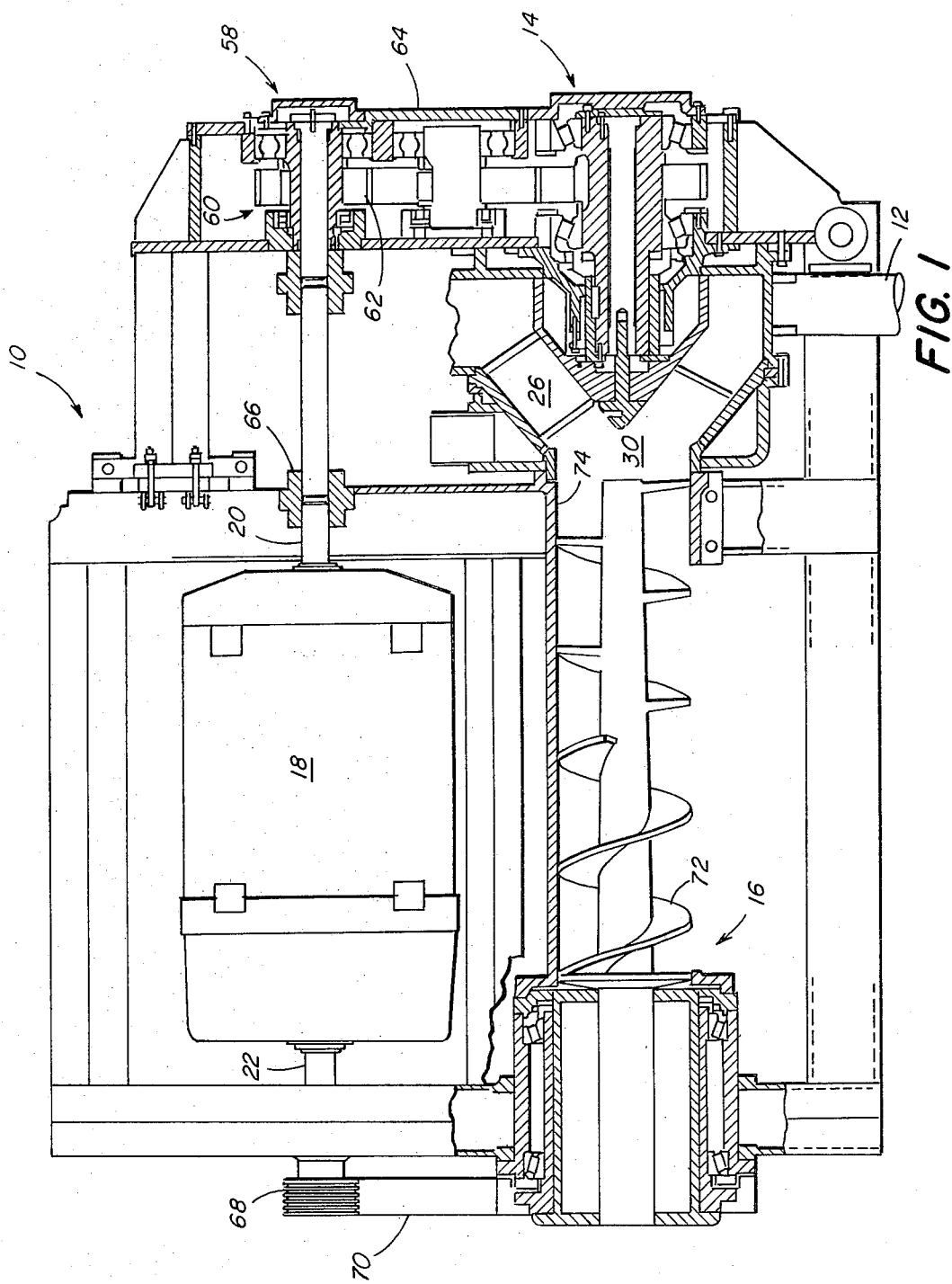
FIG. 1 is a side elevation of an injector embodying the invention.

Referring now to the drawings, particularly FIG. 1, there is shown an injector 10 embodying the invention for injection of material such as particulate solids into a transport line 12. Injector 10 includes a helical inducer 14 and a feeder 16. Helical inducer 14 and feeder 16 are driven by a driver 18, for example a double ended motor having oppositely extending shafts 20 and 22. As hereinafter described, particulate solids are fed into helical inducer 14 by feeder 16 and then injected into transport line 12 by the helical inducer.

Figure 2:
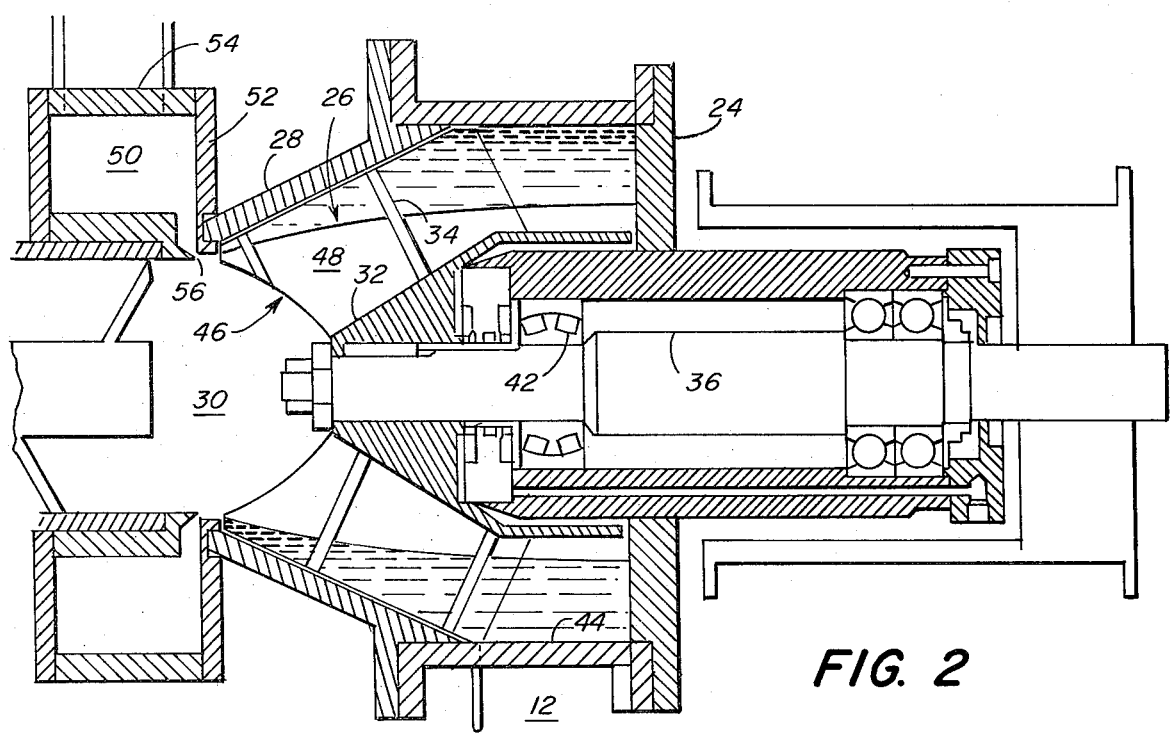
FIG. 2 is a sectional view of the inducer of FIG. 1.

As shown in FIG. 2, helical inducer 14 includes a housing 24 having a frusto-conical nose 28 with an internal chamber 26 that terminates in an inlet port 30 through which the particulate solids from feeder 16 enter inducer 14. A rotor 32 with a helical blade 34 is mounted in housing 24 and constrained for rotation within chamber 26 at nose 28. Rotor 32 has a conical shape that tapers inwardly towards inlet port 30. In an alternate embodiment, rotor 32 is provided with more than one helical blade. Rotor 32 is mounted on a shaft 36 that is journaled in bearings 42, for example tapered roller type bearings which provided maximum stiffness. Helical blade 34 has a gradually expanding diameter from inlet port 30 towards a discharge port 44 formed in housing 24 rearwardly of nose 28. Blade 34 is configured to create a fluid vortex 46 having a ventilated core 48 from a fluid 50, for example water, contained in a reservoir 52 at the forward end of nose 28. Water 50 enters reservoir 52 through an inlet 54 and is directed into chamber 26 at the leading edge of blade 34 through an inlet port or slot 56. When rotor 32 is driven by driver 18, blade 34 maintains vortex 46 and pressurizes housing 24 at discharge port 44. Particulate solids that are fed into inlet port 30 by feeder 16 are picked up by blade 34, flung outwardly and submerged in vortex 46. The fluid level in helical inducer 14 adjusts automatically in response to applied back or discharge pressure in transport line 12. In response to an increase in back pressure, ventilated core 48 contracts or decreases until the pressure in housing 24 is equalized to the back pressure without any decrease in flow. That is, as the back pressure increases, core 48 contracts and fluid vortex 46 expands. Blade 34 engages a greater portion of fluid 50, whereby the pressure within housing 24 increases until it balances the back pressure. Similarly, in response to a decrease in back pressure, core 48 expands and the pressure in housing 24 decreases until the pressures are equalized.

Rotor 32 is driven by driver 18 through a gear assembly 58 which includes a gear train 60 having three helical gears 62 mounted in a gear box 64. Shaft 20 of driver 18 is connected to gears 62 through a flexible coupling 66 and shaft 36 is connected directly to gears 62. In the illustrated embodiment, by way of example, driver 18 is an 1800 rpm, 400 horsepower motor and rotor 32 has a diameter of 31.5 inches and rotates at 1000 rpm. As previously indicated, driver 18 also drives feeder 16. Shaft 22 of driver 18 is provided with a pulley 68 that carries an endless belt 70 that is drivingly connected to feeder 16.

Feeder 16 includes a feed screw 72, for example, a single flight, twelve inch pitch screw that is mounted in eighteen inch tapered roller bearings. In the illustrated embodiment, by way of example, feed screw 72 has a diameter of fifteen inches and is rotated at 500 rpm. A screw barrel 74 disposed about feed screw 72 is fitted to housing 24 at inlet port 30 so that the particulate solids are thrown directly into blades 34 of rotor 32.

Figure 3:
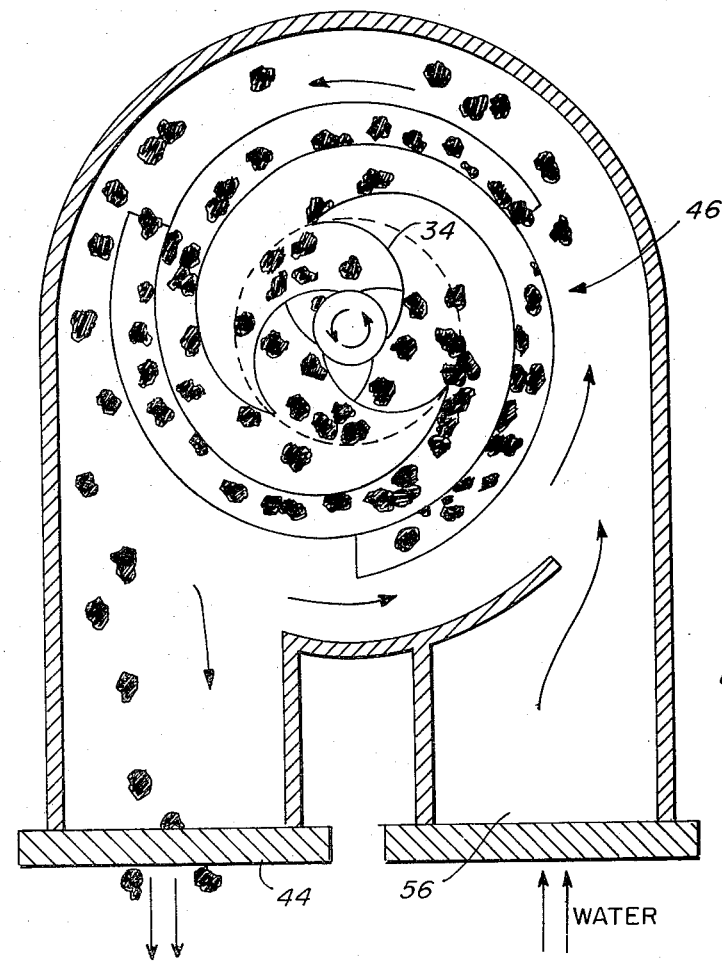
FIG. 3 is a schematic diagram illustrating certain operational characteristics of the invention.

As shown in the schematic diagram of FIG. 3, the particulate solids are fed into vortex 46 which is created by rotating blade 34. In the illustrated embodiment, by way of example, rotor 32 is provided with three helical blades 34, each blade having a sickle-shaped leading edge. Vortex 46 carries the particulate solids rearwardly into chamber 26 towards discharge port 44 for injection into transport line 12.

Since certain changes may be made in the foregoing disclosure without departing from the scope of the invention herein involved, it is intended that all matter contained in the above description, and depicted in the accompanying drawings be construed in an illustrative and not in a limiting sense.

What is claimed is:

1. A material transport device comprising:
    (a) a housing having a frusto-conical nose with an internal chamber, said housing including first and second inlet means and outlet means that communicate with said chamber, said nose tapering inwardly from said outlet means to said second inlet means, said first inlet means configured to direct a liquid external of said housing into said chamber, said second inlet means configured to receive the material to be transported, said material discharged through said outlet means; and
    (b) rotor means having a conical shape mounted within said housing for rotation in said chamber at said nose, said rotor means including blade means configured to create a vortex having a central ventilated core from said liquid directed into said chamber through said first inlet means;
    (c) said vortex transporting said material at said second inlet means to said outlet means, said material injected into said vortex through said second inlet means, said vortex carrying said material from said second inlet means to said outlet means.

2. The material transport device as claimed in claim 1 wherein said blade means includes at least one helical blade.

3. The material transport device as claimed in claim 2 wherein said helical blade has a gradually expanding diameter from said second inlet means to said outlet means.

4. The material transport device as claimed in claim 3 wherein said blade has a sickle-shaped leading edge.

5. A material transport system comprising:
    (a) a housing having a frusto-conical nose with an internal chamber, said housing including first and second inlet means and outlet means that communicate with said chamber, said nose tapering inwardly from said outlet means to said second inlet means, said first inlet means configured to direct a liquid external of said housing into said chamber, said second inlet means configured to receive the material to be transported;
    (b) rotor means having a conical shape mounted in said housing and constrained for rotation within said chamber at said nose, said rotor means including blade means configured to create a vortex having a ventilated core from said liquid directed into said chamber at the tip of said blade means through said first inlet means when said rotor is rotated, a mouth of said vortex adjacent said second inlet means;
    (c) drive means operatively connected to said rotor means for rotating said rotor means at a sufficiently high rate to create said vortex; and
    (d) feed means at said second inlet means for injecting a material to be transported into said vortex, said material transported by said vortex from said second inlet means and discharged through said outlet means, the level of said liquid in said chamber increasing and decreasing to equalize pressure within said housing and back pressure at said outlet means.

6. The material transport system as claimed in claim 5 wherein said first inlet means is disposed adjacent said second inlet means, said fluid directed at said mouth of said vortex.

7. The material transport system as claimed in claim 5 wherein said blade means includes at least one helical blade.

8. The material transport system as claimed in claim 7 wherein said helical blade has a gradually expanding diameter from said second inlet means to said outlet means.

9. The material transport system as claimed in claim 5 wherein said feed means is a feed screw, said material to be transported is delivered to said second inlet means by said feed screw and carried to said outlet means by said vortex.

10. The material transport system as claimed in claim 5 wherein said blade means is a helical blade wrapped about said conically shaped rotor means, said rotor means tapering inwardly toward said second inlet means, said helical blade having a gradually expanding diameter that increases from said second inlet means towards said outlet means.

* * * * *